(12) United States Patent
Bar et al.

(10) Patent No.: US 7,757,816 B2
(45) Date of Patent: Jul. 20, 2010

(54) TRANSMISSION HAVING A COAXIAL LUBRICANT PUMP

(75) Inventors: Andreas Bar, Lampertheim (DE); August Kriebernegg, Köflach (AT); Günter Weber, Deutsch Kaltenbrunn (AT)

(73) Assignee: Magna Powertrain AG & Co KG, Lannach (AT)

( * ) Notice: Subject to any disclaimer, the term of this patent is extended or adjusted under 35 U.S.C. 154(b) by 487 days.

(21) Appl. No.: 11/801,425

(22) Filed: May 9, 2007

(65) Prior Publication Data

US 2007/0271914 A1 Nov. 29, 2007

(30) Foreign Application Priority Data

May 10, 2006 (AT) .............................. GM378/2006

(51) Int. Cl.
*F16D 31/02* (2006.01)
*F16H 41/24* (2006.01)

(52) U.S. Cl. ..................... 184/6.28; 184/6.12; 184/6.3; 475/116; 475/88; 60/330; 60/456; 415/225; 418/104; 418/170

(58) Field of Classification Search ............... 184/6.28; 277/593, 595, 614, 620; 60/456; 417/364; 474/114–116; *F16J 15/18; F16D 31/02; F04C 15/00*
See application file for complete search history.

(56) References Cited

U.S. PATENT DOCUMENTS 3,588,125 A 6/1971 Mastromatteo
3,751,918 A * 8/1973 Helmer .......................... 60/330
4,103,906 A * 8/1978 Gits ............................. 277/391
5,044,883 A * 9/1991 Neueder ................... 415/214.1
5,117,936 A * 6/1992 Nakamura et al. .......... 180/242
5,697,861 A 12/1997 Wilson
6,406,398 B1 * 6/2002 Hughes et al. .............. 475/116
6,568,688 B1 5/2003 Boeck
2002/0017159 A1 * 2/2002 Hayabuchi et al. ........ 74/606 R

FOREIGN PATENT DOCUMENTS

| DE | 39 04 978 C2 | | 1/1994 |
| DE | 19526268 | * | 6/2002 |
| EP | 1 378 687 A2 | | 1/2004 |
| JP | 09-217837 | | 12/1997 |

* cited by examiner

*Primary Examiner*—Robert A Siconolfi
*Assistant Examiner*—San Aung
(74) *Attorney, Agent, or Firm*—Harness, Dickey & Pierce, P.L.C.

(57) ABSTRACT

A transmission has a lubricant pump which is arranged in the interior of a transmission housing and which includes a rotor rotationally fixedly connected to a transmission shaft in a pump housing, with the pump housing being rotationally fixedly connected to the transmission housing and being sealed with respect to a cylindrical sealing surface of the transmission housing, and with the lubricant pump pumping into a pressure chamber which surrounds the transmission shaft and which is sealed with respect to the transmission shaft. To achieve a good seal and centration of the pump housing, the pump housing is sealed by means of a resilient ring with respect to the cylindrical sealing surface of the transmission housing, with the ring being received by an outer peripheral groove of the pump housing with radial clearance so that the pump housing can adjust itself in the radial direction.

24 Claims, 4 Drawing Sheets

TRANSMISSION HAVING A COAXIAL LUBRICANT PUMP

CROSS-REFERENCE TO RELATED APPLICATIONS

This application claims the benefit of Austrian Utility Model No. GM 378/2006, filed May 10, 2006. The disclosure of the above application is incorporated herein by reference.

FIELD

The invention relates to transmissions having a lubricant pump which is arranged in the interior of a transmission housing and which includes a rotor rotationally connected to a transmission shaft in a pump housing, with the pump housing being rotationally fixedly connected to the transmission housing and being sealed with respect to a cylindrical sealing surface of the housing and with the lubricant pump sucking from a sump and pumping into a pressure chamber which surrounds the transmission shaft, which is sealed with respect to the transmission shaft and from which the lubricant moves into the interior of the transmission shaft.

BACKGROUND

The statements in this section merely provide background information related to the present disclosure and may not constitute prior art.

The transmissions referred to above are transmissions of the type installed in motor vehicles and, in particular, transmissions equipped with a lubricant pump and having increased lubricant requirements or large amounts of heat to be dispersed, for instance when they include a friction clutch. This is above all the case with controllable transfer transmissions for all-wheel vehicles. To provide a drive of the lubricant pump which is as direct as possible, displacement pumps are advantageously used whose rotor is fixedly seated on a transmission shaft, preferably the transmission output shaft. They are usually internal gear pumps, Gerotor pumps or the like.

Such a transfer transmission having a pump rotor seated on an output shaft is known from U.S. Pat. No. 5,697,861. The pump housing there is fixedly screwed to the transmission housing. It is disadvantageous in this design that a precise installation of the pump housing is not possible due to the long tolerance chain. The consequence is poor sealing and high wear at the seal of the pressure space due to load-dependent deflection of the shaft, also on the use of especially sintered bushings, and thereby pressure loss in the pressure space and insufficient lubricant pressure in the shaft. The installation of the pump is also difficult due to the accessibility.

To remedy these disadvantages, the screw connection between the pump housing and the transmission housing was moved away from such that the rotationally fixed connection was established by a plurality of radial arms and the pump housing was sealed by O rings with respect to the cylindrical sealing surface of the transmission housing. However, the O rings do not give the pump housing sufficient radial freedom of movement to adjust itself, they constrict it, but they do give it sufficient freed of movement to be set into a wobbling movement by even the slightest excitation (eccentricity, for example). This increases the wear of the sintered bushing forming the seal of the pressure space and generates an irritating noise. In addition, displacements between the rotor and the pump housing have a disadvantageous effect. This solution is thus also not satisfactory.

SUMMARY

It is therefore the object of the invention to find a solution for the sealing and centration of the pump housing which avoids these disadvantages. In accordance with the invention, the pump housing is sealed by means of a resilient ring with respect to the cylindrical sealing surface of the transmission housing, with the ring being received by an outer peripheral groove of the pump housing with radial clearance so that the pump housing can adjust itself in the radial direction. It can thereby follow eccentricities of the shaft without wobbling. The resilient ring acts like a labyrinth seal which also maintains its sealing effect with a radial offset of the pump housing in the transmission housing. The sealing effect is due to the resilience of the ring and the sealing contact of the ring at the axially normal planes which bound the peripheral groove at the pump housing. No wobbling of the housing can thereby occur either and the seal of the pressure space with respect to the transmission shaft is thus self-centering and very low in wear.

The resilient ring is preferably formed by a metal ring in order to have high elasticity and resilience. To ensure a good sealing effect and to permit the explained radial offset of the pump housing in the transmission housing, the resilient ring preferably has a rectangular cross-section.

The resilient ring can be a closed ring seated with a corresponding fit in the cylindrical sealing surface of the housing or the ring can be interrupted in the manner of a piston ring in the peripheral direction. The resilient ring can then form a hook in a further development of the invention, said hook engaging into a cut-out of the pump housing. The resilient ring can thus not turn. Its interruption remains at the top, where no seal is necessary.

In a preferred embodiment of the transmission, it is a ring rib of the transmission housing which forms the cylindrical sealing surface and an oil collection space. It can form interruptions for an overflow and/or a drain. A higher liquid level can thus be maintained in the separate oil collection space (it provides the improved lubrication of a remote bearing of the transmission output shaft).

DRAWINGS

The drawings described herein are for illustration purposes only and are not intended to limit the scope of the present disclosure in any way.

DETAILED DESCRIPTION

Figure 1:
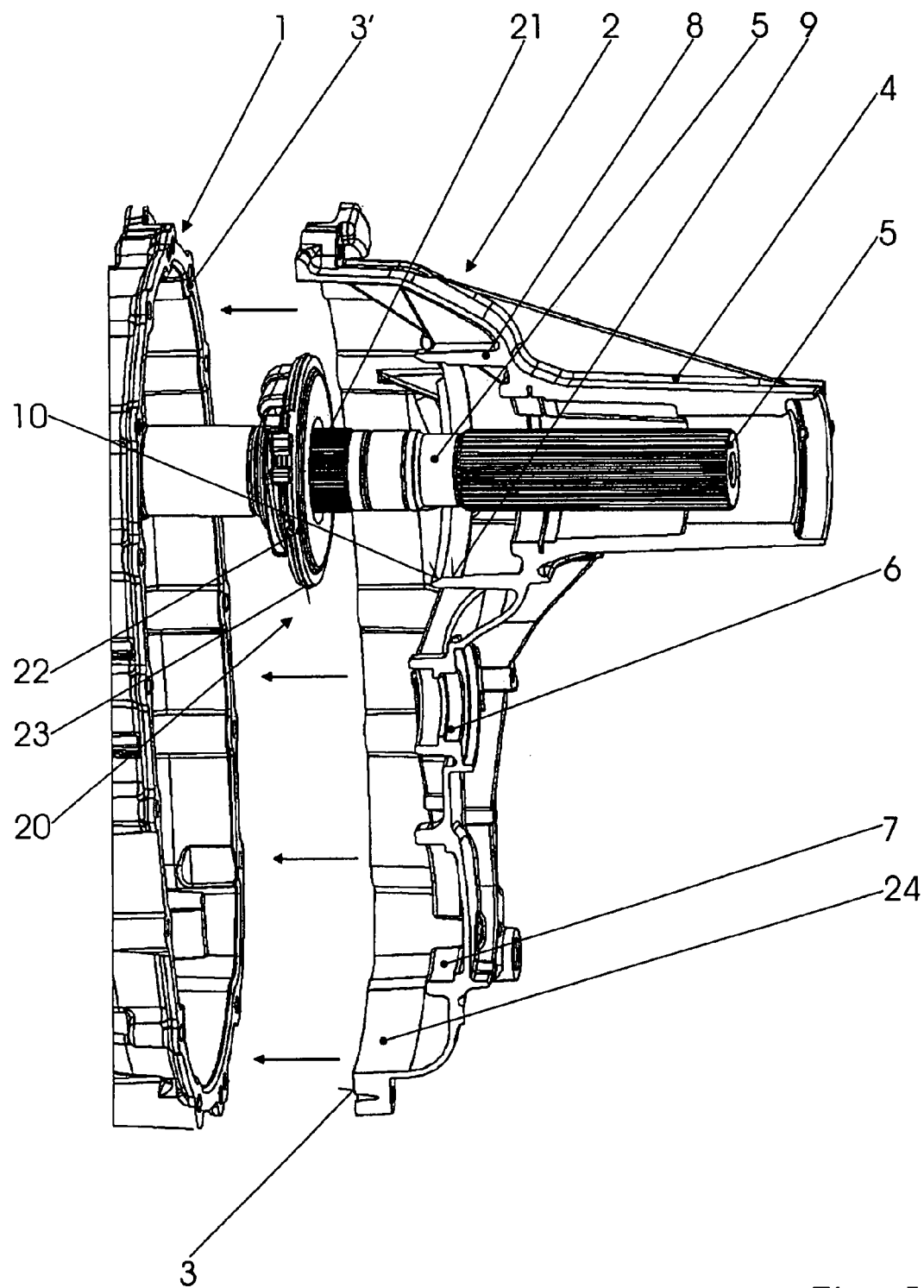
FIG. 1 is an exploded view of a transfer transmission suitable for the use of the invention.

The following description is merely exemplary in nature and is not intended to limit the present disclosure, application, or uses. It should be understood that throughout the drawings, corresponding reference numerals indicate like or corresponding parts and features.

Figure 2:
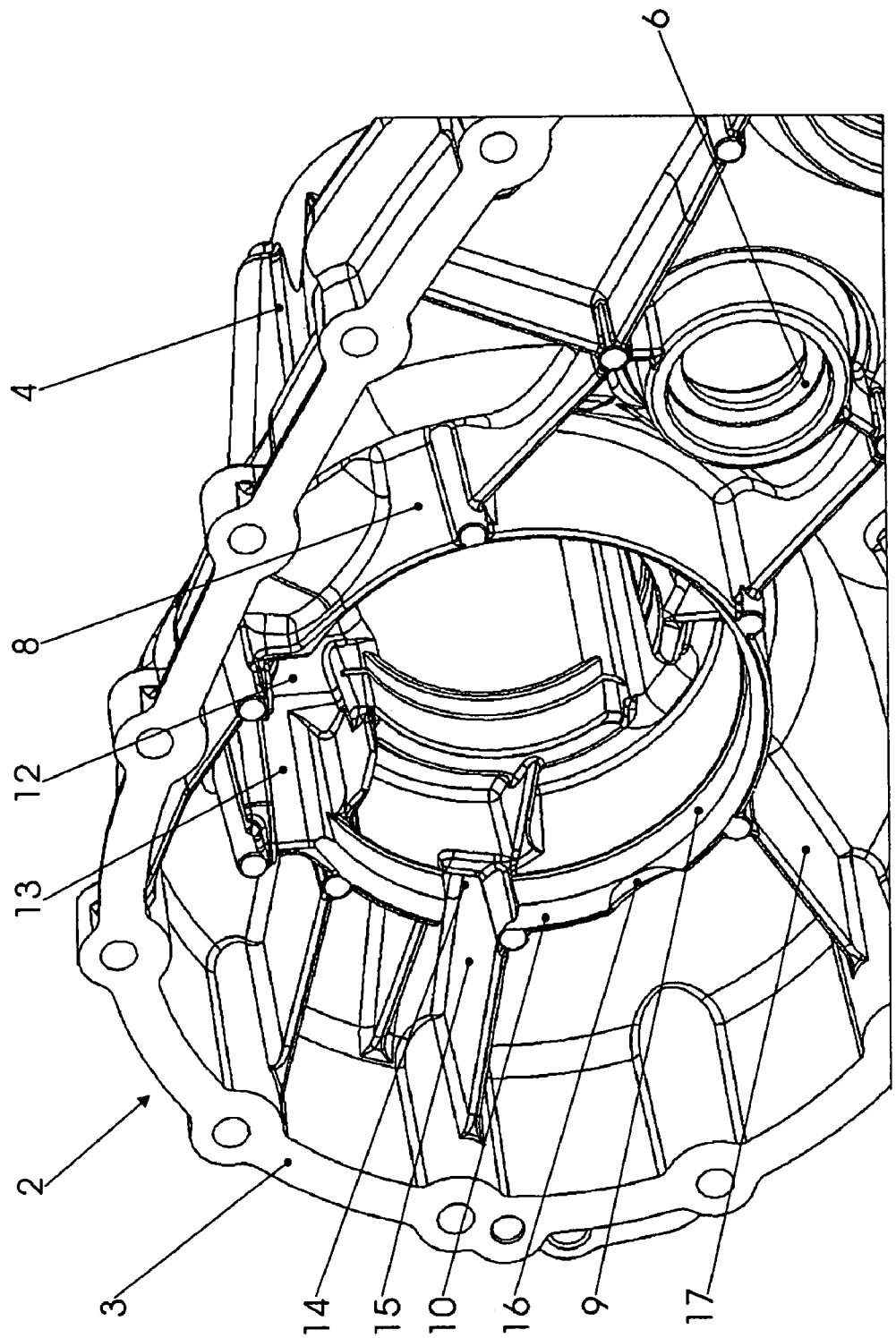
FIG. 2 is an axonometric inner view with respect to FIG. 1.

In FIG. 1, the front half of a transmission housing is designated by 1 and the rear half by 2. In an assembled transmission, they are connected to one another in the usual manner along their join surfaces 3, 3'. The rear housing half 2 (see FIG. 2, from here) is shell-shaped overall and has a rearwardly directed neck 4 which receives bearings, not shown, for a transmission output shaft 5. Care must be taken for the lubrication of these remote bearings. The rear housing half 2 extends from the transmission output shaft 5 downwardly or, as in the embodiment shown, obliquely laterally downwardly and has further bearing seats 6, 7 there for further shafts of the transmission.

The housing half 2 has a ring rib 8 concentric to the transmission output shaft 5, said ring rib forming a cylindrical sealing surface 9 with a conical chamfer 10 formed before it. The ring rib 8 has a first interruption 12 at a first point which releases two abutment surfaces 13 (only one is visible) for security against rotation. A second interruption 14 of the ring rib 8 forms an overflow 15 and a third interruption 16 at the geodetically lowest point forms a drain of narrow cross-section. The ring rib 8 is supported by some approximately radially extending stiffening ribs (e.g. 17). The ring rib 8 serves the reception of a lubricant pump 20 which is pulled out in FIG. 1; in the state ready for operation, it is supported in the manner in accordance with the invention inside the cylindrical sealing surface 9. The pump 20 is concentric with the transmission output shaft 5 and its rotor (see below) is driven by means of a coupling toothed arrangement 21 on the transmission output shaft 5. In FIG. 1, only a pump housing 22 of the lubricant pump 20 can be seen and whose outer edge 23 cooperates with the cylindrical sealing surface 9. Furthermore, an oil sump 24 is indicated at the lowest point of the transmission housing 1, 2.

Figure 3A:
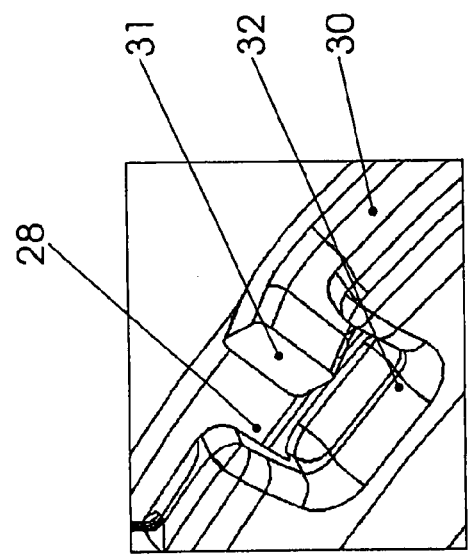
FIG. 3 is a detailed view according to III in FIG. 1.
Figure 3B:
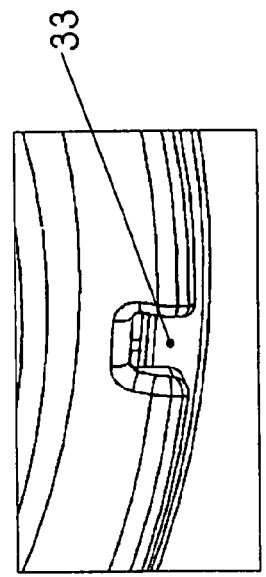
Figure 3:
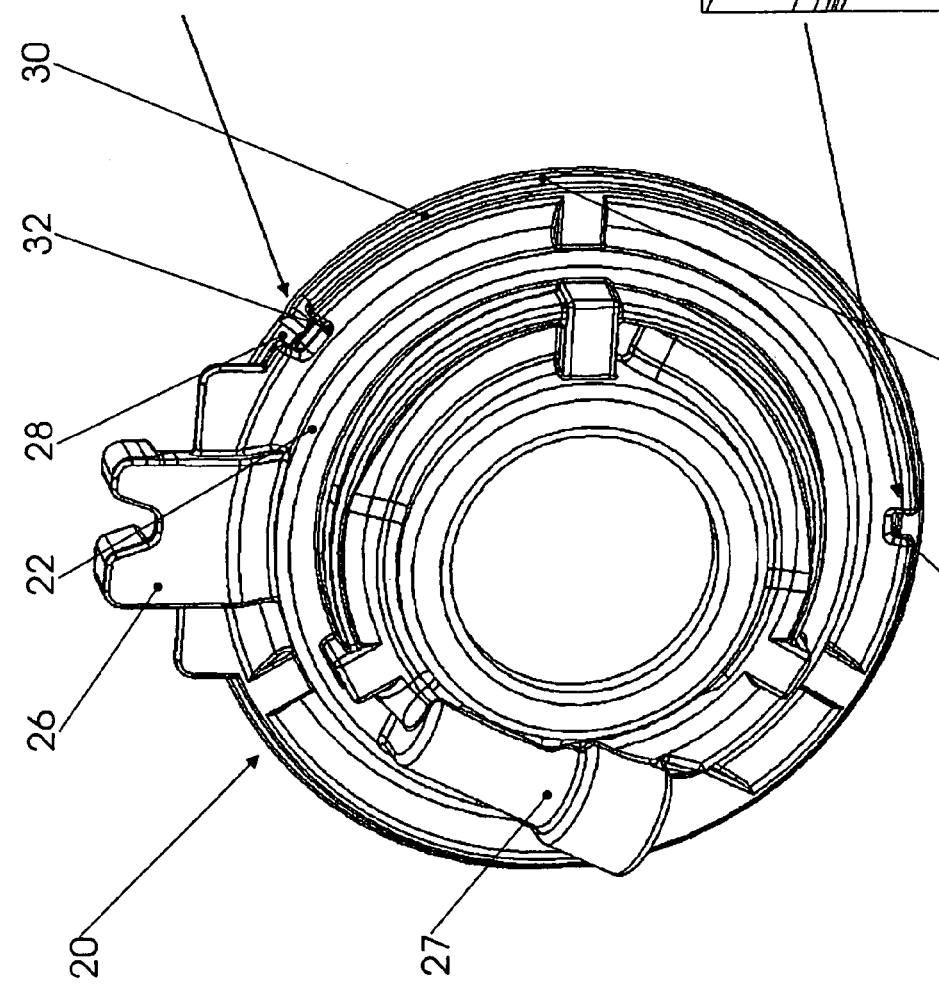

In FIG. 3, the oil pump housing 22 is shown viewed from the front housing half 1. The oil pump housing 22 has an arm 26 for security against rotation. This arm or parts thereof engage into the first interruption 12 of the ring rib 8 and contact the contact surfaces 13. Furthermore, a stub 27 can be recognized from which a suction pipe, not shown, leads down into the sump 24 of the transmission. A ring groove 28 extending all around to receive a resilient ring 30 is worked in at the outer edge 23 of the oil pump housing 22. The resilient ring preferably comprises spring steel, but can also be made of another metal or of a metal alloy provided it has the required elasticity and resilience. In FIG. 3a, an end of the spring ring 30 can be seen in enlarged form which forms a hook 31. This hook 31 engages into a first recess 32 at the outer edge 23 of the oil pump housing 22. A second cut-out 33 can be recognized at the geodetically lowest point of the housing 22. It serves the draining of lubricant to allow the whole transmission contents to flow out on an oil change.

Figures 4, 4A:
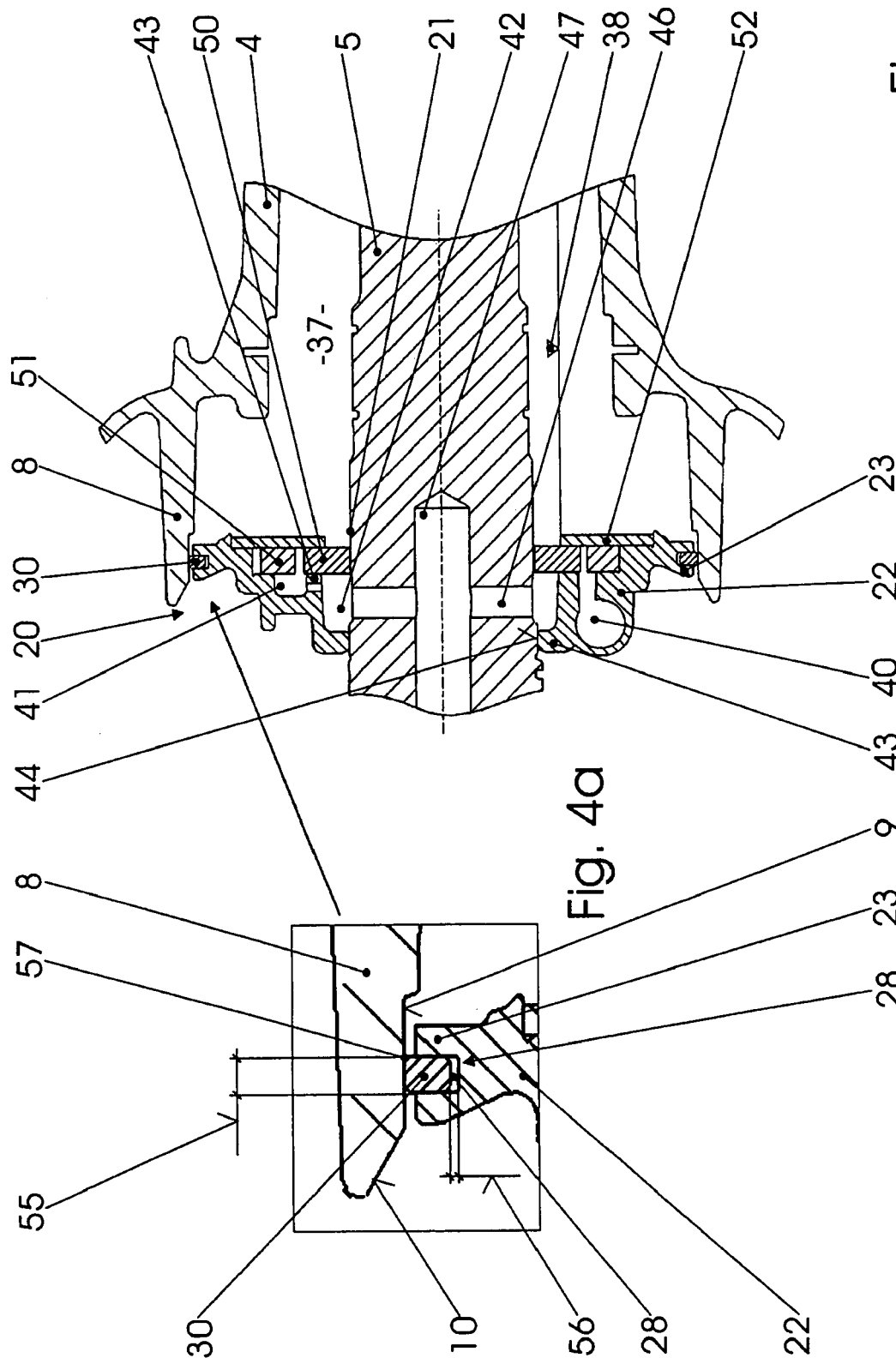
FIG. 4 is a section according to IV-IV in FIG. 3.

In FIG. 4, the lubricant pump 20 is shown in an installed position. It forms a wall inside the cylindrical sealing surface 9, said wall separating an auxiliary space 37 from the main space of the transmission containing the gears or the like. A higher oil level 38 for the lubrication of the bearings, not shown, is maintained in this space 37. The housing 22 of the oil pump 20 is the housing of a displacement pump which can be a gear pump, a Gerotor pump, a vane pump or the like. The housing forms a suction chamber 40 connected to the stub 27 (see FIG. 3), a pressure chamber 41 and, connected to it via a passage, a ring space 42. The pressure generated by the pump is present in this ring space 42 so that the housing forms a sealing gap 44 at a collar 43 surrounding the shaft 5. It is this sealing gap 44 which was exposed to high wear in oil pumps of this arrangement of the prior art.

The pressurized lubricant moves from the ring space 42 through a transverse bore 46 into a longitudinal bore 47 of the shaft 5 on which, for example, a friction clutch is seated which has to be cooled intensely. A rotor 50 is fixedly seated on the coupling toothed arrangement 21 of the shaft 5. It cooperates in the embodiment shown with a rotatable toothed ring 51 in the manner of a Gerotor pump and thus conveys in the known manner from the suction chamber 40 to the pressure chamber 41. Finally, the housing of the oil pump 20 is closed on the other side of the rotor 50 by a cover 52.

FIG. 4a shows the sealing in accordance with the invention between the oil pump housing 22 and the ring rib 8 in detail. The outer edge 23 of the oil pump housing 22 has a ring groove 28 which extends all round and has parallel sealing surfaces 55 in an axially normal plane. A spring ring 30 with radial clearance 56, but as little axial clearing as possible, is seated in the ring groove 28. Here, it is a ring interrupted in the manner of a piston ring which can thus expand radially due to its spring force. It thereby sealingly contacts the cylindrical sealing surface 9, but gives the housing 22 of the oil pump 20 freedom of movement in the radial direction. To facilitate installation, the ring rib 8 has a conical chamfer which outwardly adjoins the cylindrical sealing surface 9 and which urges the ring 30 formed with slightly rounded edges 57 into the ring groove 28 against its own spring force on the installation of the oil pump.

Thanks to this design of the seal between the pump housing 22 and the ring rib 8, the former has freedom of movement in the radial direction so that the oil pump housing 22 can be centered at the sealing gap 44 so that wear practically no longer occurs there and therefore also no sintered bushing or the like with special resistance ability is required. Since the spring ring 30 contacts the cylindrical fit surface 9 with substantial spring force and due to a lack of increased friction at the collar 43, wobbling of the oil pump housing 22, with all its damaging consequences, no longer occurs. The resilient ring 30, however, also satisfies its sealing function in an exceptional manner because it acts as a labyrinth seal. The interruption of the resilient ring is not an irritant if it lies above the oil level 38 in the auxiliary space 37.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A transmission, comprising:
a lubricant pump (20), which is arranged in the interior of a transmission housing (2) and which includes a rotor (50) rotationally fixedly connected to a transmission shaft (5) in a pump housing (22), with the pump housing being rotationally fixedly connected to the transmission housing (2) and being sealed with respect to a cylindrical sealing surface (9) of the transmission housing, wherein the lubricant pump draws from a sump (24) and pumps into a pressure chamber (41) surrounding the transmission shaft (5), with the pump housing (22) being sealed by means of a resilient ring (30) with respect to the cylindrical sealing surface (9) of the transmission housing (2), with the resilient ring being received by an outer peripheral groove (28) of the pump housing (22) with radial clearance (56) so that the pump housing (22) can adjust itself in the radial direction.

2. A transmission in accordance with claim 1, wherein the resilient ring (30) is interrupted in the manner of a piston ring in the peripheral direction.

3. A transmission in accordance with claim 2, wherein the resilient ring (30) forms a hook (31) at one end which engages into a cut-out (32) of the pump housing (22).

4. A transmission in accordance with claim 1, wherein the cylindrical sealing surface (9) of the transmission housing (2) is formed by a ring rib (8) of the transmission housing (2) which forms an oil collection space (37).

5. A transmission in accordance with claim 4, wherein the ring rib (8) forms interruptions (14, 16) for an overflow (15) and/or a drain (16).

6. A transmission in accordance with claim 1, wherein the resilient ring (30) is formed by a metal ring.

7. A transmission in accordance with claim 1, wherein the resilient ring (30) has a rectangular cross-section.

8. A transmission in accordance with claim 1, wherein the pressure chamber (41) is sealed with respect to the transmission shaft and wherein the lubricant moves from the pressure chamber (4) into the interior of the transmission shaft.

9. A transmission comprising:
   a transmission housing including a cylindrical sealing surface;
   a shaft rotatably positioned within the transmission housing;
   a spring ring; and
   a pump including a drive member driven by the shaft and a pump housing coupled to the transmission housing, the pump housing including an outer peripheral groove in receipt of the spring ring, the spring ring biasedly engaging the sealing surface and being radially spaced apart from the pump housing to allow the pump housing to move radially relative to the transmission housing.

10. The transmission of claim 9 wherein the spring ring is split and is radially inwardly compressed during initial engagement with the sealing surface.

11. The transmission of claim 9 wherein the groove and the spring ring are sized to minimize relative axial movement therebetween.

12. The transmission of claim 9 wherein the pump housing includes a radially extending arm cooperating with the transmission housing to restrict relative rotation therebetween.

13. The transmission of claim 9 wherein the spring ring includes a hook formed at one end, the hook being positioned within a recess in the pump housing.

14. The transmission of claim 13 wherein the hook radially inwardly extends into the recess.

15. The transmission of claim 9 wherein the spring ring includes a rectangular cross-section.

16. The transmission of claim 9 wherein the spring ring is metallic.

17. The transmission of claim 9 wherein the pump provides pressurized fluid to an interface between the pump housing and the shaft.

18. The transmission of claim 9 wherein the pump provides pressurized fluid to a passage longitudinally extending through the shaft.

19. A transmission comprising:
   a transmission housing including an internal substantially cylindrically shaped rib having a cylindrical sealing surface;
   a shaft rotatably positioned within the transmission housing and extending through the rib;
   a spring ring having an outer cylindrically shaped surface and an inner cylindrically shaped surface; and
   a pump including a drive member driven by the shaft and a pump housing coupled to the transmission housing via the spring ring, the pump housing including a groove in receipt of the spring ring, the outer surface of the spring ring biasedly engaging the sealing surface, the inner surface of the spring ring being radially spaced apart from the pump housing to allow the pump housing to move radially relative to the transmission housing.

20. The transmission of claim 19 wherein the groove and spring ring are sized to minimize relative axial movement therebetween.

21. The transmission of claim 19 wherein the spring ring includes a hook formed at one end, the hook being positioned within a recess in the pump housing.

22. The transmission of claim 19 wherein the pump includes an internal gear driven by the drive member to pump pressurized fluid through a passage longitudinally extending through the shaft.

23. A transmission, comprising:
   a transmission housing;
   a transmission shaft; and
   a lubricant pump arranged in the interior of the transmission housing and including a pump housing and a rotor fixed for rotation with the transmission shaft within the pump housing, the pump housing is non-rotatably fixed to the transmission housing and is sealed with respect to a cylindrical sealing surface of the transmission housing, wherein the lubricant pump draws from the sump and pumps into a pressure chamber formed entirely within the pump housing and which surrounds the transmission shaft, and wherein the pump housing is sealed by a resilient ring with respect to the cylindrical sealing surface of the transmission housing, with the resilient ring disposed in an outer peripheral groove formed in the pump housing with radial clearance so that the lubricant pump can adjust itself in the radial direction.

24. The transmission of claim 23 wherein the lubricant pump is connected to the transmission housing solely by the resilient ring.

* * * * *